(12) United States Patent
Stevenson

(10) Patent No.: US 9,550,569 B2
(45) Date of Patent: Jan. 24, 2017

(54) METHOD OF AND FRAME FOR RESTRAINING A MACHINE ON A VEHICLE SEAT

(71) Applicant: Raindance Systems Pty Ltd, Jandakot (AU)

(72) Inventor: Robert Andrew Stevenson, Jandakot (AU)

(73) Assignee: Raindance Systems Pty Ltd., Jandakot (AU)

( * ) Notice: Subject to any disclaimer, the term of this patent is extended or adjusted under 35 U.S.C. 154(b) by 0 days.

(21) Appl. No.: 14/192,286

(22) Filed: Feb. 27, 2014

(65) Prior Publication Data

US 2014/0175136 A1     Jun. 26, 2014

Related U.S. Application Data

(63) Continuation of application No. PCT/AU2012/001014, filed on Aug. 29, 2012.

(51) Int. Cl.
*B60R 7/04* (2006.01)
*B64D 9/00* (2006.01)

(52) U.S. Cl.
CPC ............... *B64D 9/00* (2013.01); *B60R 7/043* (2013.01)

(58) Field of Classification Search
CPC ................................. B64D 9/00; B60R 7/043
USPC ........................................................ 224/275
See application file for complete search history.

(56) References Cited

U.S. PATENT DOCUMENTS

| | | | |
|---|---|---|---|
| 3,873,010 A * | 3/1975 | Patterson | 224/275 |
| 3,934,771 A * | 1/1976 | Eberhard | 224/275 |
| 4,591,208 A * | 5/1986 | McDonald et al. | 297/487 |
| 5,507,558 A * | 4/1996 | Kain | 297/256.15 |
| 5,542,589 A * | 8/1996 | McKee | 224/275 |
| 5,628,439 A * | 5/1997 | O'Hara | 224/275 |
| 5,687,893 A * | 11/1997 | Jacobsmeyer, Jr. | 224/275 |
| 5,884,967 A * | 3/1999 | Gasper | B60N 2/286 297/216.11 |
| 6,135,546 A * | 10/2000 | Demtchouk | B60N 3/002 108/44 |
| 6,382,745 B1 * | 5/2002 | Adkins | B60N 3/002 108/97 |
| 6,773,123 B1 | 8/2004 | Hatchett | |

(Continued)

FOREIGN PATENT DOCUMENTS

WO    WO2005049377 A1    6/2005

OTHER PUBLICATIONS

International Search Report for International Application PCT/AU2012/001014, mailed Oct. 15, 2012.

(Continued)

*Primary Examiner* — Corey Skurdal
(74) *Attorney, Agent, or Firm* — Fish & Richardson P.C.

(57) ABSTRACT

A frame has a first frame portion configured to sit on a base of a vehicle seat and demountably receive a machine. A second portion of frame is coupled with and extends substantially upright from the first portion. The second portion is adjacent and bears against a back of the seat. Extending across the second portion from side to side is a lateral frame element. The lateral frame element enables the frame to be secured on and to the seat by way of a conventional seat belt. The frame also includes a pivoting support shown in this embodiment as a tray for supporting a box of capsules which are dispensed by the machine.

12 Claims, 6 Drawing Sheets

(56) References Cited

U.S. PATENT DOCUMENTS

| | | | |
|---|---|---|---|
| 7,246,855 B2* | 7/2007 | Langmaid | B60N 2/2806 297/256.13 |
| 7,284,637 B2* | 10/2007 | Abe et al. | 181/156 |
| 7,559,606 B2 | 7/2009 | Hei et al. | |
| 2004/0222345 A1* | 11/2004 | Lindsay | B60N 3/103 248/311.2 |
| 2005/0253431 A1 | 11/2005 | Hei | |
| 2006/0091169 A1* | 5/2006 | Lippert et al. | 224/275 |
| 2007/0152000 A1* | 7/2007 | Franzi | 224/275 |
| 2008/0067205 A1* | 3/2008 | Semendoff | 224/275 |
| 2011/0101054 A1 | 5/2011 | Wicinski | |

OTHER PUBLICATIONS

International Preliminary Report on Patentability for International Application No. PCT/AU2012/001014, issued Mar. 4, 2014.
Patent Examination Report No. 1 for Australian Application No. 2012304264 mailed Aug. 22, 2014.
Patent Examination Report No. 2 for Australian Application No. 2012304264 mailed Oct. 29, 2015.
Patent Examination Report No. 3 for Australian Application No. 2012304264 mailed May 19, 2016.

* cited by examiner

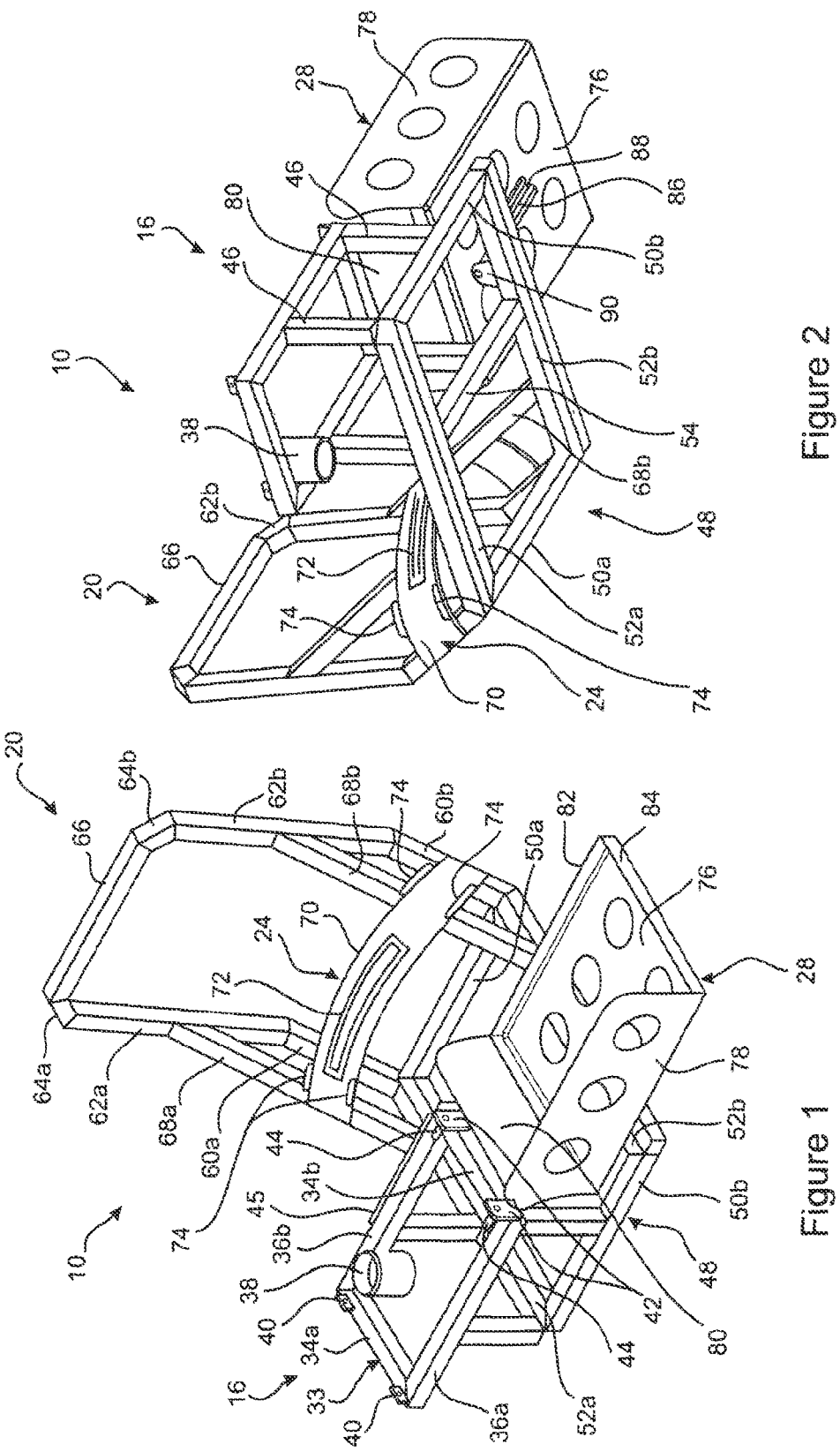

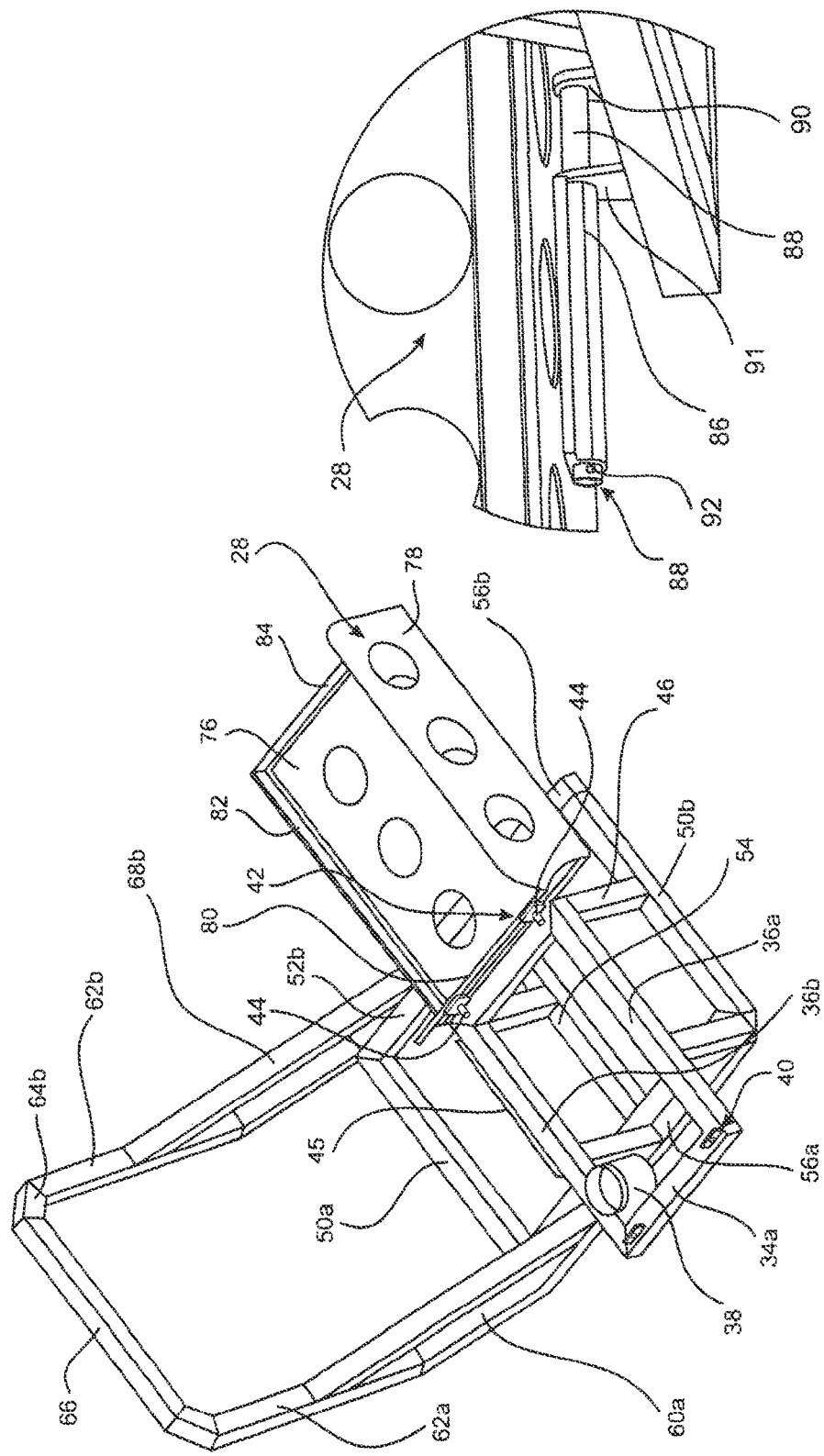

METHOD OF AND FRAME FOR RESTRAINING A MACHINE ON A VEHICLE SEAT

FIELD OF THE INVENTION

The present invention relates to a method of, and frame for, restraining a machine on a vehicle aircraft seat. The present invention more particularly, but not exclusively relates to a method of, and frame for, restraining an incendiary dispensing machine on an aircraft seat to facilitate aerial dispensing of the capsules.

BACKGROUND OF THE INVENTION

The present inventor has developed a capsule belt and a machine arranged to separate capsules from the belt and dispense them from a moving vehicle including but not limited to an aircraft. The capsules in a belt can contain a range of products. In one example the capsules contain one part of a two part incendiary mixture. A number of these belts and a capsule dispensing machine are placed in an aircraft together with a supply of the second part of the mixture. The machine is coupled to the supply and a leading end of a capsule belt fed into the machine. In the case of the aircraft being a helicopter, prior to take off, the machine is fastened in a door frame by a belly strap. When the helicopter is airborne and over a target area the machine operates to inject the second part of the mixture into a capsule, cut the injected capsule from the belt and allow the capsule to drop to the ground.

It is critical for safety purposes that the machine be held securely in the aircraft. This requires constant monitoring of the belly strap which may loosen in-flight.

SUMMARY OF THE INVENTION

In one aspect there is provided a frame for restraining machine on vehicle seat provided with an associated seat belt, the frame comprising:

- a first portion configured to sit on the seat and demountably receive a capsule dispensing machine;
- a second portion coupled with and extending substantially upright from the first portion; and,
- a lateral frame element that extends across the second portion from one side to another, the lateral frame element positioned wherein a lap portion of the fastened seat belt bears against the lateral frame element.

In a second aspect there is provided a frame for restraining a machine on a vehicle seat provided with an associated seat belt, the frame being configured to sit on the vehicle seat and engage the seat belt when the seat belt is in a fastened condition to secure the frame to the seat, the frame comprising a first portion configured to demountably receive a machine.

In one embodiment of the second aspect the frame comprises a second portion coupled with and extending substantially upright from the first portion, wherein the first frame portion is arranged to lie on a base of the seat and the second portion is configured to lie adjacent or bear against a back of the seat.

In one embodiment of the second aspect the frame comprises a lateral frame element that positioned so that a lap portion of the fastened seat belt bears against the lateral frame element.

In one embodiment of the either aspect the frame comprises the lateral frame element is formed of a width greater than a width of the lap portion of the fastened seat belt.

In one embodiment of the either aspect the lateral frame element is configured to have an intermediate portion that bulges toward the first frame portion relative to end portions of the lateral frame element.

In one embodiment of the either aspect the lateral frame element comprises a curved plate.

In one embodiment of the either aspect lateral frame element comprises a seat belt retainer.

In one embodiment of the either aspect the seat belt retainer is a strip of high friction material attached to the lateral frame element at a location which underlies and contacts the lap portion of the fastened seat belt.

In one embodiment of the either aspect the seat belt retainer comprises respective ridges extending along opposite edges of the lateral frame element at locations wherein the lap portion of the fastened seat belt lies between the ridges.

In one embodiment of the either aspect the frame comprises a support pivotally coupled to the first portion.

In one embodiment of the either aspect the frame comprises a tubular stub attached to the first frame portion and a drop tube demountably connected with the stub.

In one embodiment of the either aspect the frame comprises a mirror movably supported on the first frame.

In one embodiment of the either aspect the frame comprises at least one side restraint depending from one side of the first frame portion.

In a third aspect there is provided a method of restraining a machine on vehicle seat provided with an associated seat belt, the method comprising:

- locating a frame having: a first portion configured to sit on the seat and demountably receive the machine and a second portion coupled with and extending substantially upright from the first portion; on the vehicle seat with the first portion on the seat and the second portion adjacent a back of the seat;
- fastening the seat belt of the seat wherein a strap of the seat belt passes over and across the second portion of the frame;
- locating a machine on the first portion; and
- demountably coupling the machine to the first portion.

In one embodiment fastening the seat belt comprises locating a lap portion of the fastened seat belt to bear against a lateral frame element of the frame.

In a fourth aspect there is provided a method of restraining a machine on a vehicle seat provided with a seat and associated seat belt, the method comprising

- locating a frame according to the first or second aspects on the vehicle seat with the first portion on the seat;
- fastening the seat belt of the seat wherein a strap of the seat belt passes across and engages the frame;
- locating the machine on the first portion; and
- demountably coupling the machine to the first portion.

BRIEF DESCRIPTION OF THE DRAWINGS

An embodiment of the drawings will now be described with reference to the drawings in which:

FIG. 1 is an isometric view from a first angle of an embodiment of a frame in accordance with an embodiment of the present invention;

FIG. 2 is an isometric view from a second angle of the frame;

FIG. 3 is an isometric view from the top of the frame;

FIG. 4 is an enlarged view of a portion of the frame;

DETAILED DESCRIPTION OF THE PREFERRED EMBODIMENTS

Figure 5:
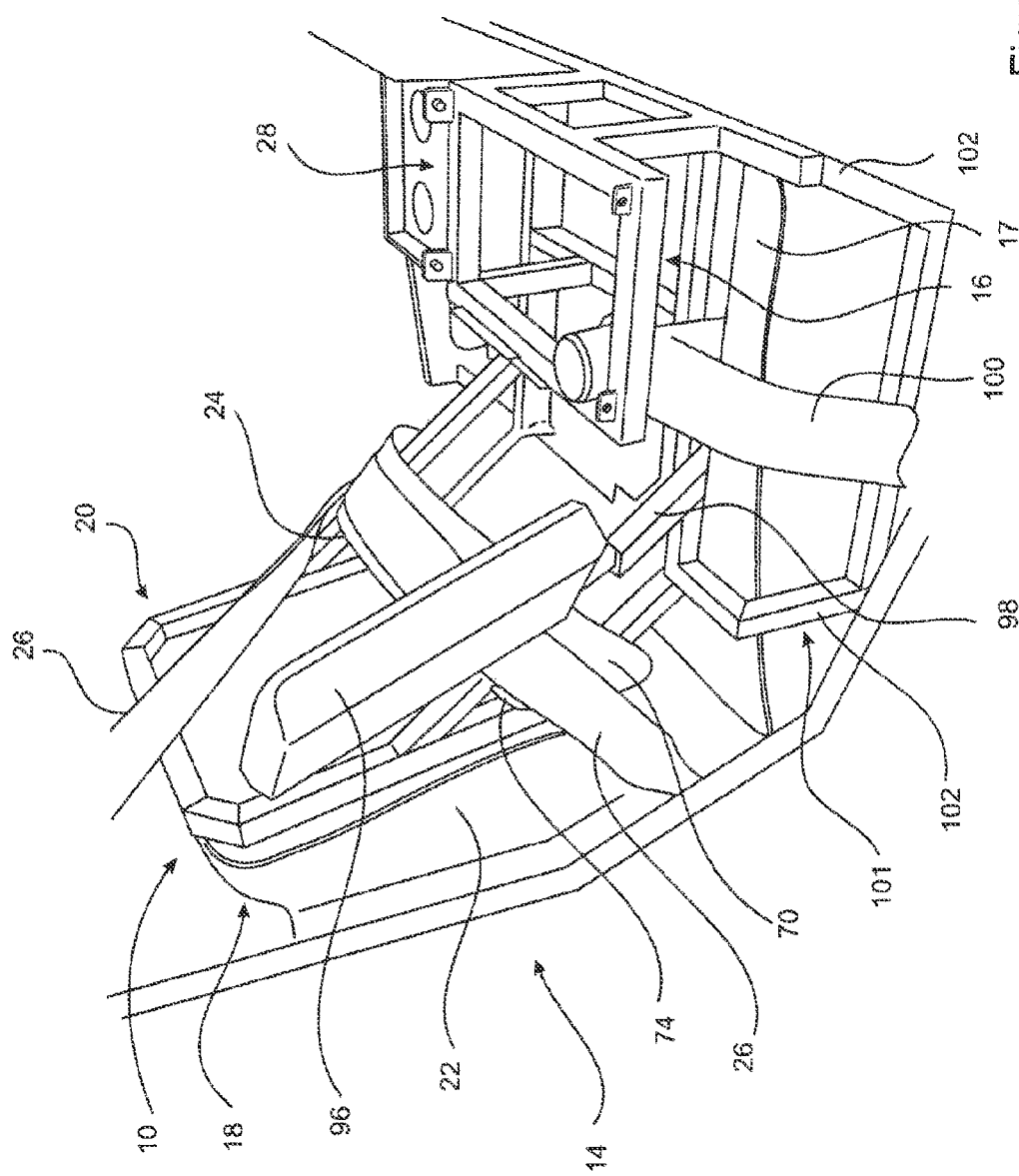
FIG. 5 is a photograph of an embodiment of the frame attached to a seat of an aircraft.

The accompanying drawings illustrate an embodiment of a frame 10 that can be used to restrain a machine 12 on a vehicle seat 18. In this embodiment the machine is an incendiary dispensing machine and the vehicle is an aircraft 14 such as but not limited to manned and unmanned, fixed wing aircraft or helicopters. However as will be readily understood by those of ordinary skill in the art embodiments of the hereinafter described frame can be used to restrain a machine on a seat of other vehicles such as a wheeled road vehicle including a SUV, truck, or four wheel drive.

The frame 10 may be considered as comprising several frame portions. A first frame portion 16 is configured to sit on a base 17 of the aircraft seat 18 and demountably receive a capsule dispensing machine 12. A second portion 20 of frame 10 is coupled with and extends substantially upright from the first portion 16. The second portion 20 is adjacent and bears against a back 22 of the seat 18. Extending across the second portion 20 from side to side is a lateral frame element 24 (which is removed from the drawing in FIG. 3). As will be described in greater detail below, the lateral frame element 24 enables the frame 10 to be secured on and to the seat 18 by way of a conventional seat belt 26. The frame 10 also includes a pivoting support shown in this embodiment as a tray 28 for supporting a box 30 of capsules 32 which are dispensed by the machine 12.

The frame 10 is largely constructed from steel square tubes which are welded together. First frame portion 16 comprises a rectangular upper sub frame 33 made from square tubes 34a, 34b which are of the same length as each other, and square tubes 36a and 36b which are of the same length as each other and longer than tube 34a. A cylindrical drop tube stub 38 is attached to the tube 36b on an inside of the frame. Pip pin anchor plates 40 project upwardly from an upper surface of tube 34a. Extending upwardly from tube 34b is a pair of anchor plates 42. Each anchor plate 42 is provided with an anchor peg 44 that extends in a direction toward pip pin anchor plates 40. The plates 40 and 42 are located near respective corners of the upper frame 33. An upright side support ledge 45 extends along the tube 36b for a length between tube 34b and the stub 38.

Frame 10 also includes a rectangular center sub frame 48 which lies on a plane parallel to and below upper frame 33. Four legs 46 connect the upper frame 33 to center frame 48. The center sub frame 48 comprises steel square tubes 50a and 50b of equal length to each other, and square tube 52a and 52b which are also of equal length but longer than the tubes 50a and 50b. The center sub frame 48 is completed by a brace 54 that extends between tubes 52a and 52b and underlies the tube 36b.

Extending parallel with and attached to the tube 52a is a square tube truss 56a. A further square tube truss 56b extends parallel with and is connected to the tube 52b. Two of the legs 46 connected to the truss 56a, one of the legs 46 connects to the tube 50b, and the remaining leg 46 connects to the cross brace 54. The upper sub frame 33, legs 46 and center frame 48 may be considered as forming the first portion 16 of the frame 10.

The second portion 20 comprises braces 60a and 60b; tubes 62a and 62b; corners 64a and 64b; cross tube 66; and long braces 68a and 68b. Braces 60a and 60b extend from trusses 56a and 56b respectively. The braces 60a and 60b are inclined upwardly and away from the first frame portion 16. Tube 62a and 62b extend from the braces 60a and 60b respectively perpendicular to a plane containing the upper sub frame 33. Corners 64a and 64b are attached to the ends of tubes 62a and 62b respectively and extend toward each other. Cross tube 66 extends between and connects the corners 64a and 64b together. Long braces 68a and 68b extend between the truss 56a and tube 62a; and truss 56b and tube 62b respectively.

The lateral frame element 24 is in the form of a curved plate 70 which is attached to and extends laterally across the second frame portion 20. More particularly respective mounts 73 attached the concave side of the plate 70 to the braces 60a and 60b. This is shown most clearly in the second embodiment described later. The plate 70 is convexly curved when the frame 10 is viewed front on so that an intermediate or central portion of the plate 70 bulges toward the first frame portion 16. A strip 72 of high friction material such as rubber is attached to the curved plate 70 at a position or location so as to underlie a lap section of seatbelt 26. Ridge plates 74 may also be formed on opposite sides of the plate 72 to assist in maintaining the belt 26 on the lateral frame element 24 when the seatbelt is fastened. The ridge plates 74 are upstanding form opposite edges of the plate 70 and curve with the plate 70. The ridge plates are arranged in two pairs, one pair near the long brace 68a, and another pair near the long brace 68b.

The tray 28 comprises: a base 76; an upright flange 78 extending along one edge of base 76; a second flange 80 extending upwardly from an adjacent edge of the base 76; and two low upright walls 82 and 84 extending about the remaining two edges of the base 76. An upper portion of flange 80 curves away from the base 76 and toward the plates 42.

An elongated axle box 86 is fastened to an underside of base 76 and extends laterally of upper frame 33 and parallel to tubes 36a and 36b. An axle 88 extends through the axle box 86. One end of axle 88 is attached to a lug 90 that in turn is fixed to the tube 52b and extends through an axle bearing 91 attached to truss 56b. An opposite end of the axle 88 extends beyond the axle box 86. A pin 92 extends through the end of axle 88 thereby holding the tray 28 on the axle 88. By virtue of this arrangement the tray 28 is able to pivot about the axis of axle 88.

Figure 7:
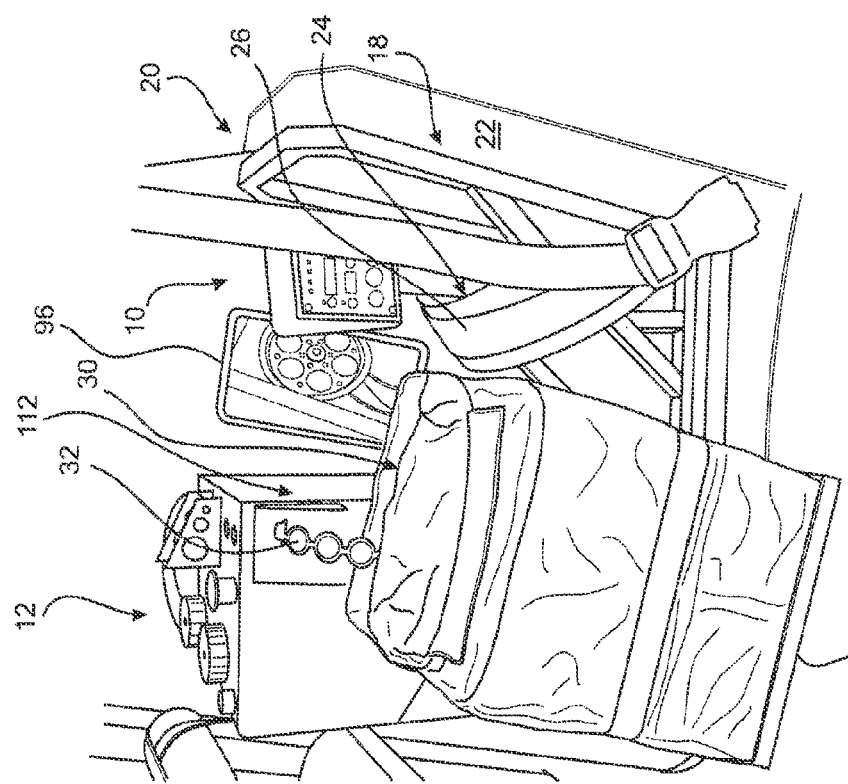
FIG. 7 is a photograph of the frame and machine shown in FIG. 6 but from an opposite side.
Figure 6:
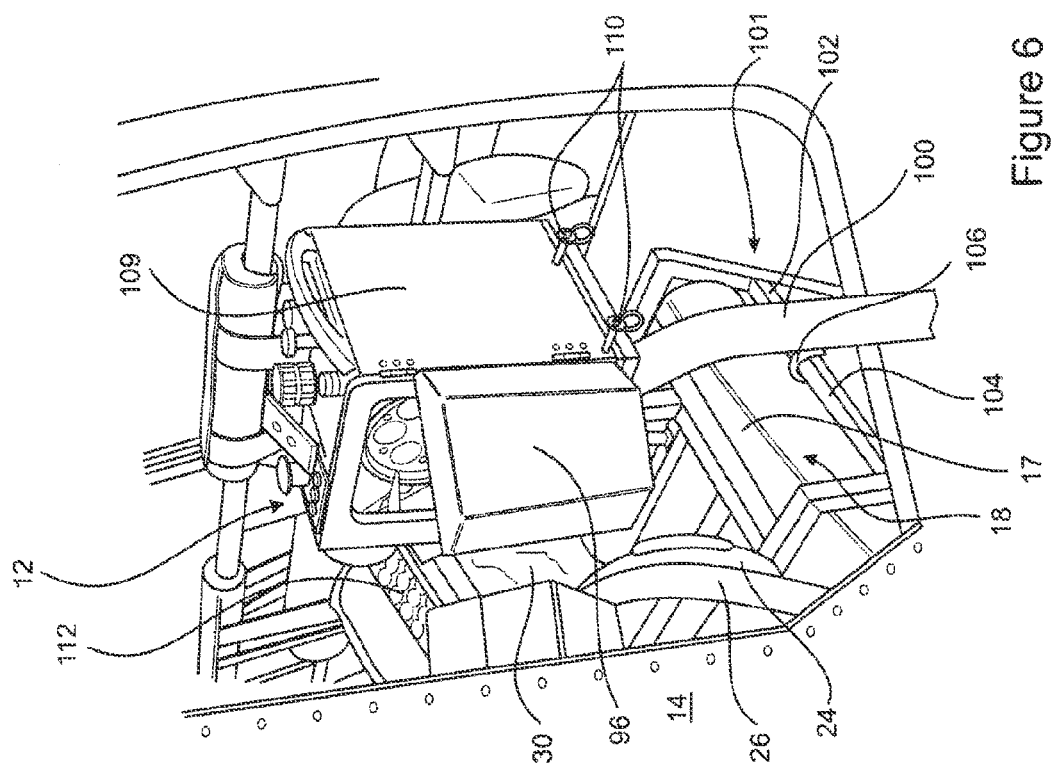
FIG. 6 is a photograph of the frame attached to an aircraft seat and supporting a capsule dispensing machine.

With particular reference to FIGS. 5 to 7, 9 and 10 it can also be seen that frame 10 is provided with a mirror 96 attached via a swivel or ball joint 97 (shown in FIG. 9) to a short arm 98 extending upwardly and outwardly from truss 56a. A drop tube 100 is also illustrated which is connected at one end to a lower end of the drop stub 38 and extends to an outside of the aircraft 14. FIGS. 5-7 also illustrate optional side restraint 101 in the form of a side sub frame 102 attached to the truss 56a. The side sub frame 102 lies adjacent a side of the base 17 of the seat 18 closest an exterior of the aircraft. As seen in FIG. 6, the side sub frame 102 includes a crossbar 104 that is engaged by a hook 106 of a drop tube 100. A second side restraint can be attached to the truss 56b to lie adjacent an opposite side of the base 17 of seat 18. Thus if both side restraints 101 are included they will lie on opposite depending sides of the base 17.

In order to retain the capsule dispensing machine 12 in the aircraft 14, frame 10 is first placed in the aircraft 14 on the seat 18. Frame 10 is orientated so that the second portion 20 bears against the back 22 of the seat 18 while the first portion 16 is disposed on the base 17 or seat portion of the seat 18. The side sub frames 102 (if used) depend from opposite sides of the seat 18. Frame 10 is held in place by fastening seat belt 26. When this occurs, a lap portion of the seatbelt extends across and bears on the lateral frame element 24 and in particular lies on the rubber strip 72 and between the ridges 74. Seatbelt 26 can now be tightened thereby securing the frame 10 to the seat 18. The facilitate attachment of the machine 12 a housing 109 of the machine 12 is provided with two locating holes positioned so as to receive the pins 44 when the machine 12 is on the upper sub frame 33. Additionally, the pin anchor plates 40 are received within a slot or recess (not shown) on an inside of the machine housing 109. Holes are also formed in the machine housing 109 that register with the holes in the anchor plates 40. Now pip pins 110 can be inserted through these holes and engage the plates 40 to thereby secure the machine 12 to the frame 10. The box 30 can be held by a belt or other means on the tray 28.

A shown in FIG. 7, the mirror 96 enables an operator of the machine 10 to easily visualise internal mechanisms of the machine.

When the aircraft 14 is in flight, a capsule belt 112 comprising a plurality of end to end joined capsules 32 is fed into the machine 12. In the event that the capsules are incendiary capsule, each capsule may contain a quantity of potassium permanganate. When the machine 12 operates it injects glycol into each capsule and then cuts the capsule from the belt allowing it to drop through the drop stub 38 and drop tube 100 out of the aircraft 14 and onto the ground.

Figure 9:
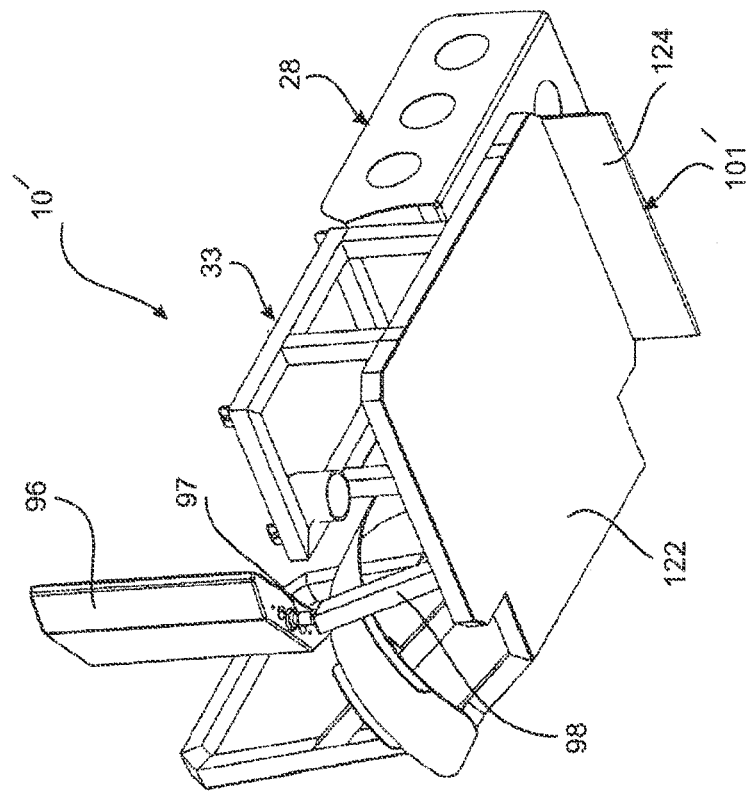
FIG. 9 is an isometric view from an alternate angle from the frame shown in FIG. 8.
Figure 8:
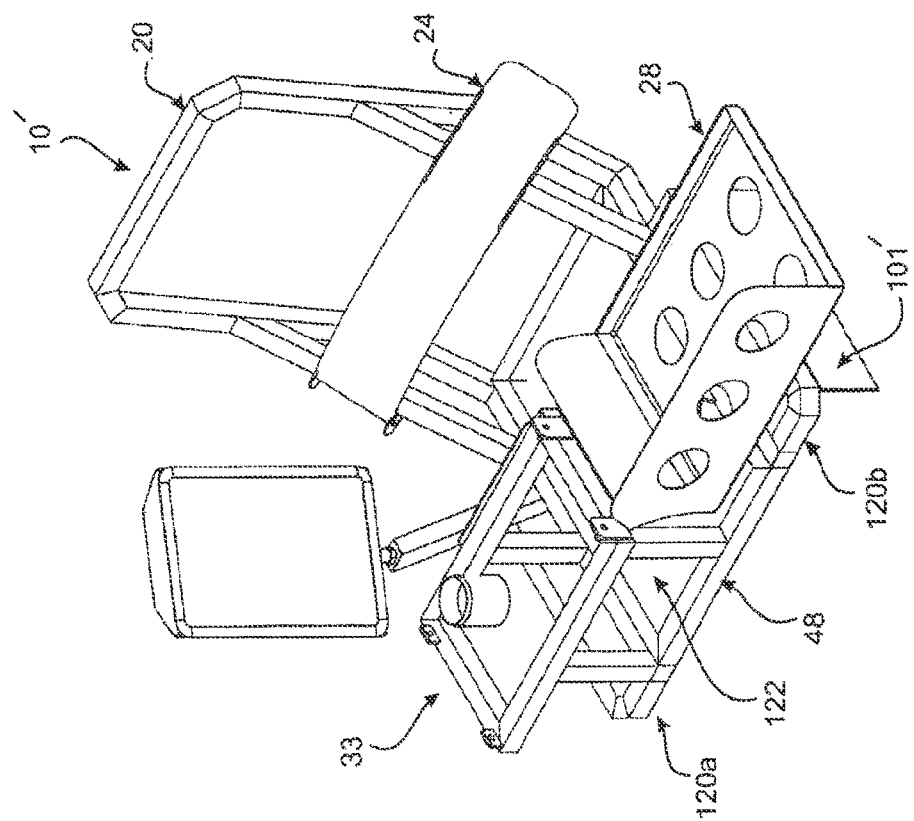
FIG. 8 is an isometric view from one angle of a second embodiment of a frame in accordance with the present invention.
Figure 10:
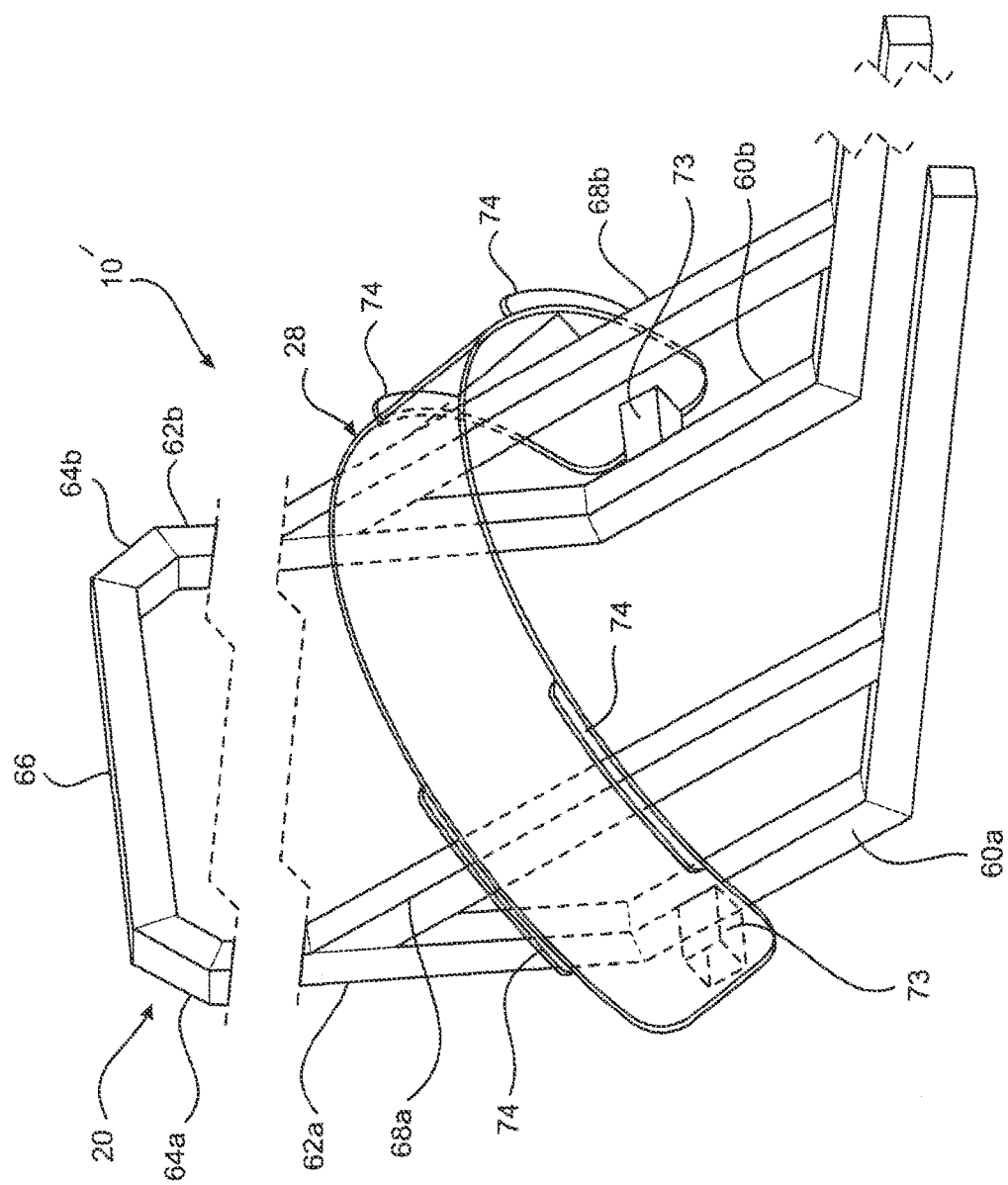
FIG. 10 illustrates a second portion and a lateral frame element of the frame in accordance with both the first and second embodiments.

FIGS. 8-10 depict a second embodiment of the frame 10'. The features of frame 10' that are the same as those of the frame 10 are denoted with the same reference numbers. The frame 10' functions in the same way as a frame 10 but has several relatively minor structural variations. Frame 10' comprises an upper sub frame 33, second portioned 20 pivoting support in a form of a tray 28 and lateral frame element 24 identical to those of frame 10. FIGS. 8-10 also more clearly show the mounts 73, mirror 96, swivel joint 97 and short arm 98 that are also incorporated in the first embodiment of the frame 10. The main differences between the frames 10 and 10' are: the provision of side extensions 120a and 120b that lie in the plane, and on opposite side, of the center frame 48 and extent laterally; a base plate 122 fixed to underside of the center frame 48 and lateral extensions 120a and 120b; and finally the provision of a single side restraint 101' in the form of a plate 124 that depends from the lateral extension 120b on side adjacent the tray 28. The side restraint plate 124 lies adjacent a side of the base 17 of the seat 18 distant the exterior of the aircraft 14. The operation of frame 10' and this method of fastening to a seat 18 are identical to that described in hereinabove before in relation to the frame 10.

It is believed that use of the frame 10 in the manner described herein to retain machine 10 complies with all relevant safety requirements under the FAA.

Modifications and variations that would be obvious to persons of ordinary skill in the art are deemed to be within the scope of the present invention the nature of which is to be determined from the above description and the appended claims. For example while various parts of the frame 10 are described as being made form steel tubes it is possible to make them from other materials such as aluminum, composite materials and plastics materials. Also while the frame is described in the context of restraining an incendiary dispensing machine the frame may support other types of machines such a liquid dispensing machine including agricultural or horticultural chemical spraying machines; or paint dispensing machines.

The invention claimed is:

1. A frame for restraining a machine on a vehicle seat having an associated seat belt, the frame comprising:
   a plurality of connected tubes arranged into a first frame portion and a second frame portion;
   the first frame portion configured to sit on the vehicle seat and demountably secure a machine to the frame;
   the second frame portion coupled with and extending substantially upright from the first frame portion;
   a lateral frame element that extends across the second frame portion from one side to another, the lateral frame element positioned wherein a lap portion of the seat belt when fastened bears against the lateral frame element; and
   a tubular stub attached to the first frame portion and a drop tube demountably connected with the stub, the drop tube being open at opposite ends to enable an article entering the drop tube at an upper end to exit the drop tube from a lower end.

2. The frame according to claim 1 wherein the lateral frame element is formed of a width greater than a width of the lap portion of the fastened seat belt.

3. The frame according to claim 1 wherein the lateral frame element is configured to have an intermediate portion that bulges toward the first frame portion relative to end portions of the lateral frame element.

4. The frame according to claim 3 wherein the lateral frame element comprises a curved plate.

5. The frame according to claim 1 wherein the lateral frame element comprises a seat belt retainer.

6. The frame according to claim 5 wherein the seat belt retainer is a strip of high friction material attached to the lateral frame element at a location which underlies and contacts the lap portion of the fastened seat belt.

7. The frame according to claim 6 wherein the seat belt retainer comprises respective ridges extending along opposite edges of the lateral frame element at a location wherein the lap portion of the fastened seat belt lies between the ridges.

8. The frame according to claim 1 comprising a support pivotally coupled to the first frame portion.

9. The frame according to claim 1 comprising a mirror movably supported on the first frame portion.

10. The frame according to claim 1 comprising at least one side restraint depending from one side of the first frame portion.

11. A frame for restraining a machine on a vehicle seat having an associated seat belt, the frame comprising a plurality of connected tubes and being configured to sit on the vehicle seat and engage the seat belt when the seat belt is in a fastened condition to secure the frame to the seat, the frame comprising:
  a first portion which incorporates a set of the plurality of the tubes and is configured to demountably secure the machine to the frame; and
  a tubular stub attached to the first frame portion and a drop tube demountably connected with the stub, the drop tube being open at opposite ends to enable an article entering the drop tube at an upper end to exit the drop tube from a lower end.

12. The frame according to claim 11 comprising a second frame portion which incorporates a further set of the plurality of the connected tubes, the second frame portion coupled with and extending substantially upright from the first frame portion, wherein the first frame portion is arranged to lie on a base of the seat and the second frame portion is configured to lie adjacent or bear against a back of the seat.

* * * * *